United States Patent
Koskela et al.

(10) Patent No.: US 8,977,276 B2
(45) Date of Patent: Mar. 10, 2015

(54) METHOD AND APPARATUS FOR DEVICE INITIATED OFFLOADING TO UNLICENSED BANDS

(75) Inventors: Timo Kalevi Koskela, Oulu (FI); Sami-Jukka Hakola, Kempele (FI); Gilles Charbit, Farnborough (GB); Vinh Van Phan, Oulu (FI)

(73) Assignee: Nokia Corporation, Espoo (FI)

( * ) Notice: Subject to any disclaimer, the term of this patent is extended or adjusted under 35 U.S.C. 154(b) by 207 days.

(21) Appl. No.: 12/837,464

(22) Filed: Jul. 15, 2010

(65) Prior Publication Data

US 2012/0015607 A1    Jan. 19, 2012

(51) Int. Cl.
*H04W 72/00* (2009.01)
*H04W 74/00* (2009.01)
*H04W 76/02* (2009.01)

(52) U.S. Cl.
CPC .................. *H04W 76/023* (2013.01)
USPC ......................... 455/450; 455/455

(58) Field of Classification Search
CPC ................ H04W 76/023; H04W 76/043
USPC ........ 455/418–422.1, 432.1–455, 11.1, 41.2, 455/515, 516, 550.1, 552.1, 553.1, 556.1, 455/556.2, 127.4, 151.2; 370/310.2, 315, 370/328–336, 338, 341, 348, 352–356, 326, 370/345
See application file for complete search history.

(56) References Cited

U.S. PATENT DOCUMENTS

| | | | |
|---|---|---|---|
| 2006/0168343 A1* | 7/2006 | Ma et al. | 709/245 |
| 2006/0252369 A1* | 11/2006 | Rasanen | 455/39 |
| 2007/0050645 A1 | 3/2007 | Siegmund | |
| 2008/0247344 A1 | 10/2008 | Bahl et al. | |
| 2009/0010235 A1* | 1/2009 | Huh et al. | 370/338 |
| 2009/0221325 A1* | 9/2009 | Periyalwar et al. | 455/552.1 |
| 2009/0310570 A1* | 12/2009 | Smith | 370/335 |
| 2010/0009675 A1 | 1/2010 | Wijting et al. | |
| 2010/0011110 A1* | 1/2010 | Doppler et al. | 709/228 |
| 2010/0029216 A1 | 2/2010 | Jovicic et al. | |
| 2011/0228666 A1* | 9/2011 | Barbieri et al. | 370/216 |

OTHER PUBLICATIONS

IEEE P802.11z™/D7.0 7 Draft Standard for Information Technology—Telecommunications and information exchange between systems—Local and metropolitan area networks—Specific requirements—Part 11: Wireless LAN Medium Access Control (MAC) and Physical Layer (PHY) specifications Amendment 6: Extensions to Direct Link Setup (DLS), Prepared by the 802.11 Working Group of the IEEE 802 Committee, 2010, 88 pages.

European Extended Search Report and Written Opinion received in corresponding European Application 11170859.0, dated Oct. 4, 2011. 9 Pages.

(Continued)

*Primary Examiner* — San Htun
(74) *Attorney, Agent, or Firm* — Mintz Levin Cohn Ferris Glovsky and Popeo, P.C.

(57) ABSTRACT

A method comprises communicating, by a first device, with a second device, using a device-to-device communication on licensed band, determining, by the first device, whether unlicensed band resources are available, and if the unlicensed band resources are available, initiating, by the first device, a set up of a device-to-device communication on unlicensed band.

10 Claims, 8 Drawing Sheets

(56) References Cited

OTHER PUBLICATIONS

Doppler, Klaus, "Device-to-Device Communications; Functional Prospects for LTE—Advanced Networks", Communications Workshops 2009. IEEE International Conference on, IEEE, Piscataway, NJ, USA, Jun. 14, 2009, pp. 1-6.

Doppler, Klaus, "Device-to-Device Communication as an Underlay to LTE—Advanced Networks", IEEE Communications Magazine, IEEE Service Center, Piscataway, US, vol. 47 No. 12, Dec. 1, 2009, pp. 42-49.

Yu et al., Unpublished U.S. Appl. No. 12/604,733, filed Oct. 23, 2009, "Systems Methods and Apparatuses for Facilitating Device-to-Device Connection Establishment."

Koskela et al., Unpublished U.S. Appl. No. 12/782,877, filed May 19, 2010, "Method and Apparatus for Providing Communication Offloading to Unlicensed Bands".

3GPP TS 23.402 V10.0.0 (Jun. 2010) Technical Specification 3rd Generation Partnership Project; Technical Specification Group Services and System Aspects; Architecture enhancements for non-3GPP accesses (Release 10).

3GPP TS 24.302 V10.0.0 (Jun. 2010) Technical Specification 3rd Generation Partnership Project; Technical Specification Group Core Network and Terminals; Access to the 3GPP Evolved Packet Core (EPC) via non-3GPP access networks; Stage 3 (Release 10).

3GPP TS 24.312 V9.1.0 (Mar. 2010), 3rd Generation Partnership Project;Technical Specification Group Core Network and Terminals;Access Network Discovery and Selection Function (ANDSF) Management Object (MO) (Release 9).

Doppler et al, "Device-to-Device communications; functional prospects for LTE-Advanced networks", International workshop on LTE evolution at IEEE International Conference on Communications (ICC), Jun. 2009.

Ericsson, "Vision 2020, 50 Billion Connected Devices—Presentation", http://www.slideshare.net/EricssonFrance/vision-2020-50-billion-connected-devices-ericsson, downloaded from the Internet Jul. 22, 2010.

IEEE Standard for Information technology—Telecommunications and information exchange between systems—Local and metropolitan area networks—Specific requirements Part 11: Wireless LAN Medium Access Control (MAC) and Physical Layer (PHY) Specifications IEEE Std 802.11™-2007 (Revision of IEEE Std 802.11-1999) Jun. 12, 2007.

IEEE P802.11s™/D3.0 Draft Standard for Information Technology—Telecommunications and information exchange between systems—Local and metropolitan area networks—Specific requirements—Part 11: Wireless LAN Medium Access Control (MAC) and Physical Layer (PHY) specifications Amendment 10: Mesh Networking IEEE P802.11s/D3.0, Mar. 2009.

\* cited by examiner

METHOD AND APPARATUS FOR DEVICE INITIATED OFFLOADING TO UNLICENSED BANDS

TECHNICAL FIELD

The example and non-limiting embodiments of the present invention relate generally to inter-device communication technology and, more particularly, relate to a method, and apparatus for device initiated offloading.

BACKGROUND

The modern communications era has brought about a tremendous expansion of wireless communication. Devices may communicate with each other via various methods, such as via device-to-device communication.

SUMMARY

According to an example embodiment of the present invention, a method is provided comprising, communicating, by a first device, with a second device, using a device-to-device communication on licensed band, determining, by the first device, whether unlicensed band resources are available, and if the unlicensed band resources are available, initiating, by the first device, a set up of a device-to-device communication on unlicensed band.

According to another example embodiment of the present invention, a method is provided comprising, communicating, by a second device, with a first device, using a device-to-device communication on licensed band, receiving instructions, from the first device, via the device-to-device communication on licensed band, to initiate determining whether unlicensed band resources are available, providing the results of said determining to the first device, utilizing device-to-device communication on licensed band, and receiving instructions, from the first device, via device-to-device communication on licensed band, to initiate a set up of at least one second device-to-device communication on unlicensed band, with the first device.

According to yet another example embodiment of the present invention, an apparatus is provided. The apparatus comprises at least one processor and at least one memory including computer program code, the at least one memory and the computer program code configured to, with the processor, cause the apparatus to at least communicate with a second apparatus a device-to-device communication on licensed band, determine whether unlicensed band resources are available, and if the unlicensed band resources are available, initiate a set up of a device-to-device communication on unlicensed band.

According to another example embodiment of the present invention, a method is provided comprising facilitating a user plane device device-to-device communication utilizing licensed band resources, the user plane device device-to-device communication enabling direct communication between a first device and at least one second device, facilitating a control plane device device-to-device communication utilizing licensed band resources, the control plane device device-to-device communication enabling direct communication at least between the first device and the at least one second device, and receiving, from the first device, offload information indicative of the user plane device device-to-device communication offloading by the first device, from licensed band to unlicensed band.

According to another example embodiment of the present invention, an apparatus is provided. The apparatus comprises at least one processor and at least one memory including computer program code, the at least one memory and the computer program code configured to, with the processor, cause the apparatus to at least facilitate a user plane device device-to-device communication utilizing licensed band resources, the user plane device device-to-device communication enabling direct communication between a first device and at least one second device, facilitate a control plane device device-to-device communication utilizing licensed band resources, the control plane device device-to-device communication enabling direct communication at least between the first device and the at least one second device, receive, from the first device, offload information indicative of the user plane device device-to-device communication offloading by the first device, from licensed band to unlicensed band.

According to a yet another embodiment of the present invention, a computer program product is provided comprising a computer-readable medium bearing computer program code embodied therein for use with a computer, the computer program code comprising code for communicating, by a first device, with a second device utilizing a device-to-device communication on licensed band, code for determining, by a first device, whether unlicensed band resources are available, and code for, if the resources are available, initiating, by a first device, a set up of a device-to-device communication on unlicensed band.

According to another embodiment of the present invention an apparatus is provided comprising at least one processor and at least one memory including computer program code, the at least one memory and the computer program code configured to, with the processor, cause the apparatus to at least communicate, by a first device, with a second apparatus, a device-to-device communication on licensed band, determine, by the first device whether unlicensed band resources are available, and if the unlicensed band resources are available, initiate, by the first device, a set up of a device-to-device communication on unlicensed band, wherein said apparatus is part of said first device.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Example embodiments of the present invention and its potential advantages are understood by referring to FIGS. 1 through 7 of the drawings.

The example embodiments of the present invention enable the set up of a device-to-device communication in the 3GPP long term evolution advanced (LTE-A) and system architecture evolution (SAE) environment. The example embodiments provide a way for a device to autonomously offload device-to-device communication from licensed band to unlicensed band.

In addition to 3GPP LTE-Advanced environment, the embodiments of the present invention may be employed with other current and future radio technologies. Some non-limiting examples of such environments are LTE, worldwide interoperability for microwave access (Wimax), code division multiple access (CDMA), CDMA2000, wideband CDMA (WCDMA) and time division-synchronous CDMA (TD-SCDMA).

Figure 1A:
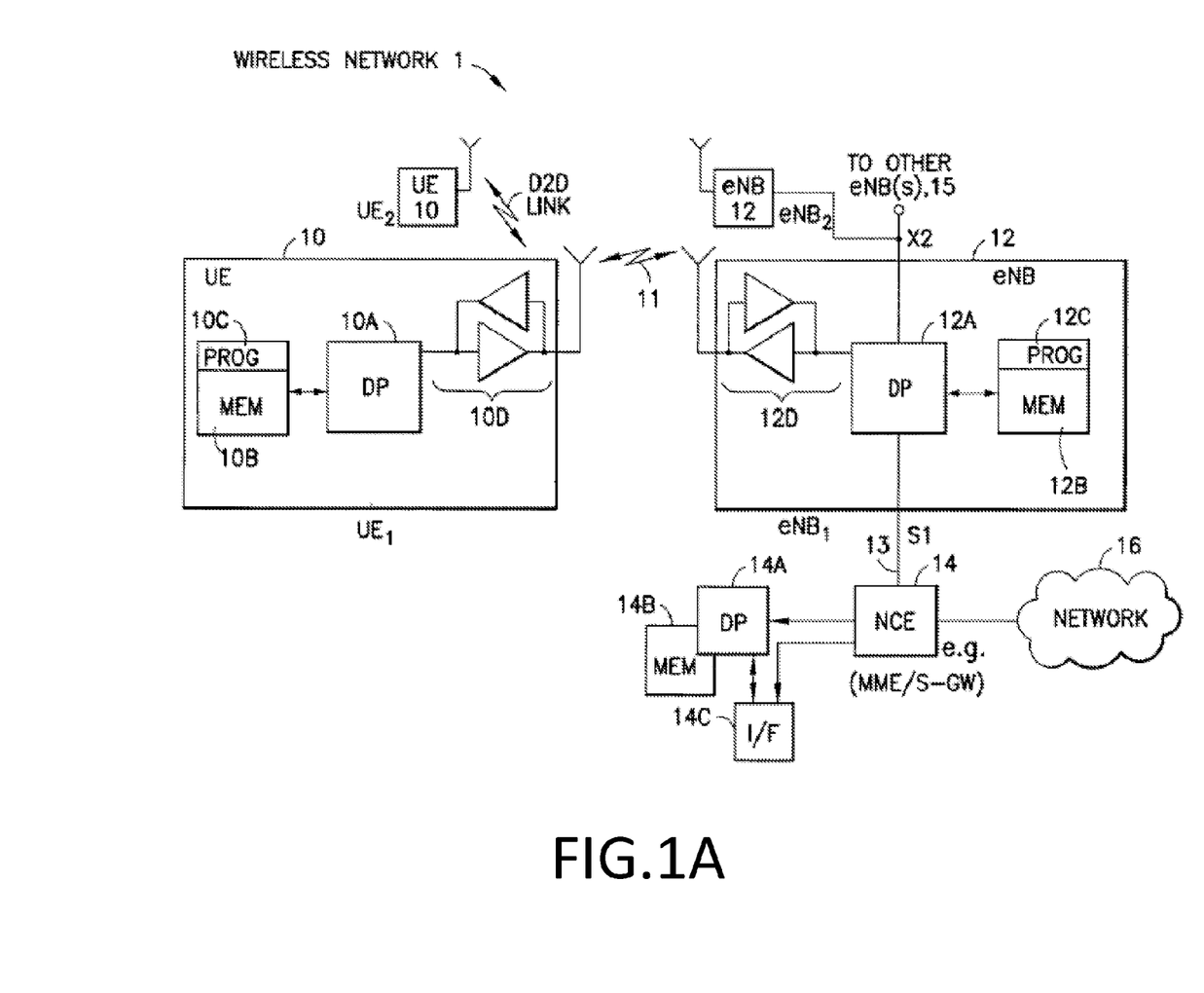
FIG. 1A shows a simplified block diagram of various electronic devices that are suitable for use in practicing example embodiments of the invention.

FIG. 1A shows a simplified block diagram of various electronic devices that are suitable for use in practicing example embodiments of the invention. In an example embodiment, a wireless network 1 is adapted for communication with a communication terminal or device, such as a mobile communication device, sensor or Internet tablet, which may be referred to as a UE1 10, via a network access node or network entity, such as a Node B (base station), and more specifically an enhanced node B, eNB1 12. The network 1 may include an infrastructure network control element (NCE) 14 (which may also be considered as a network entity) that may include the Mobility Management Entity/Serving Gateway (MME/S-GW) and which provides connectivity with a network 16, such as a telephone network and/or a data communications network (e.g., the Internet). The UE1 10 includes a data processor (DP) 10A, a memory (MEM) 10B that stores a computer program code (PROG) 10C, and a suitable radio frequency (RF) transceiver 10D for bidirectional wireless communications 11 with the eNB1 12. The eNB 12 also includes a DP 12A, a MEM 12B that stores a PROG 12C, and a suitable RF transceiver 12D. The eNB 12 is coupled via a data path 13 to the NCE 14. The NCE 14 includes memory 14A, data processor 14A and program and interfaces 14C. The data path 13 may be implemented as the S1 interface. At least one of the PROGs 10C and 12C is assumed to include program instructions that, when executed by the associated DP, enable the electronic device to operate in accordance with the example embodiments of this invention, as will be discussed below in greater detail. That is, the example embodiments of this invention may be implemented at least in part by computer software executable by the DP 10A of the UE1 10 and by the DP 12A of the eNB1 12, or by hardware, or by a combination of software and hardware.

It should be appreciated that in some cases each of the communication element or device may include antenna or antennas for transmitting signals to and for receiving signals from a base site, e.g., eNB1 12, and to and from other communication terminals or devices. Alternatively or additionally, the device may also include user interface circuitry and user interface software configured to facilitate user control of at least some functions of the mobile phone though use of a display and configured to respond to user inputs and a display and display circuitry configured to display at least a portion of a user interface of the mobile phone, the display and display circuitry configured to facilitate user control of at least some functions of the mobile phone.

The memory 10B or 12B may include, for example, one or more volatile and/or non-volatile memories. In other words, for example, the memory 10B or 12B may be an electronic storage device, for example, a computer readable storage medium, comprising gates configured to store data (e.g., bits) that may be retrievable by a machine (e.g., a computing device). The memory 10B or 12B may be configured to store information, data, applications, instructions or the like for enabling the apparatus to carry out various functions in accordance with example embodiments of the present invention. For example, the memory 10B could be configured to buffer input data for processing by the data processor 10A. Additionally or alternatively, the memory 10B could be configured to store instructions for execution by the data processor 10A. In some embodiments, the volatile memory may be random access memory (RAM). The non-volatile memory may be embedded or removable. The non-volatile memory may comprise electronically erasable programmable read only memory (EEPROM), or flash memory.

The data processor 10A or 12A may be embodied in a number of different ways. For example, the data processor 10A or 12A may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the data processor 10A may be configured to execute instructions stored in the memory 10B or otherwise accessible to the data processor 10A. Alternatively or additionally, the data processor 10A or 12A may be configured to execute hard coded functionality. As such, whether configured by hardware or software methods, or by a combination thereof, the data processor 10A or 12A may represent an entity, e.g., physically embodied in circuitry, capable of performing operations according to embodiments of the present invention while configured accordingly. Thus, for example, when the data processor 10A is embodied as an ASIC, FPGA or the like, the data processor 10A may be specifically configured hardware for conducting the operations described herein.

Alternatively, when the data processor 10A is embodied as an executor of software instructions, the instructions may specifically configure the data processor 10A to perform the algorithms and/or operations described herein when the instructions are executed. However, in some cases, the data processor 10A may be a processor of a specific device, e.g., an eNB, or other network device, adapted for employing embodiments of the present invention by further configuration of the data processor 10A by instructions for performing the algorithms and/or operations described herein. The data processor 10A may include, among other things, a clock, an arithmetic logic unit (ALU) and logic gates configured to support operation of the data processor 10A. In an example embodiment, the term circuitry refers to (a) hardware-only circuit implementations, e.g., implementations in analog circuitry and/or digital circuitry; (b) combinations of circuits and computer program product(s) comprising software and/or firmware instructions stored on one or more computer readable memories that work together to cause an apparatus to perform one or more functions described herein; or (c) circuits, such as, for example, a microprocessor(s) or a portion of a microprocessor(s), that require software or firmware for operation even if the software or firmware is not physically present. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

A "computer-readable storage medium," which refers to a non-transitory, physical storage medium (e.g., volatile or non-volatile memory device), can be differentiated from a "computer-readable transmission medium," which refers to an electromagnetic signal.

Figure 1B:
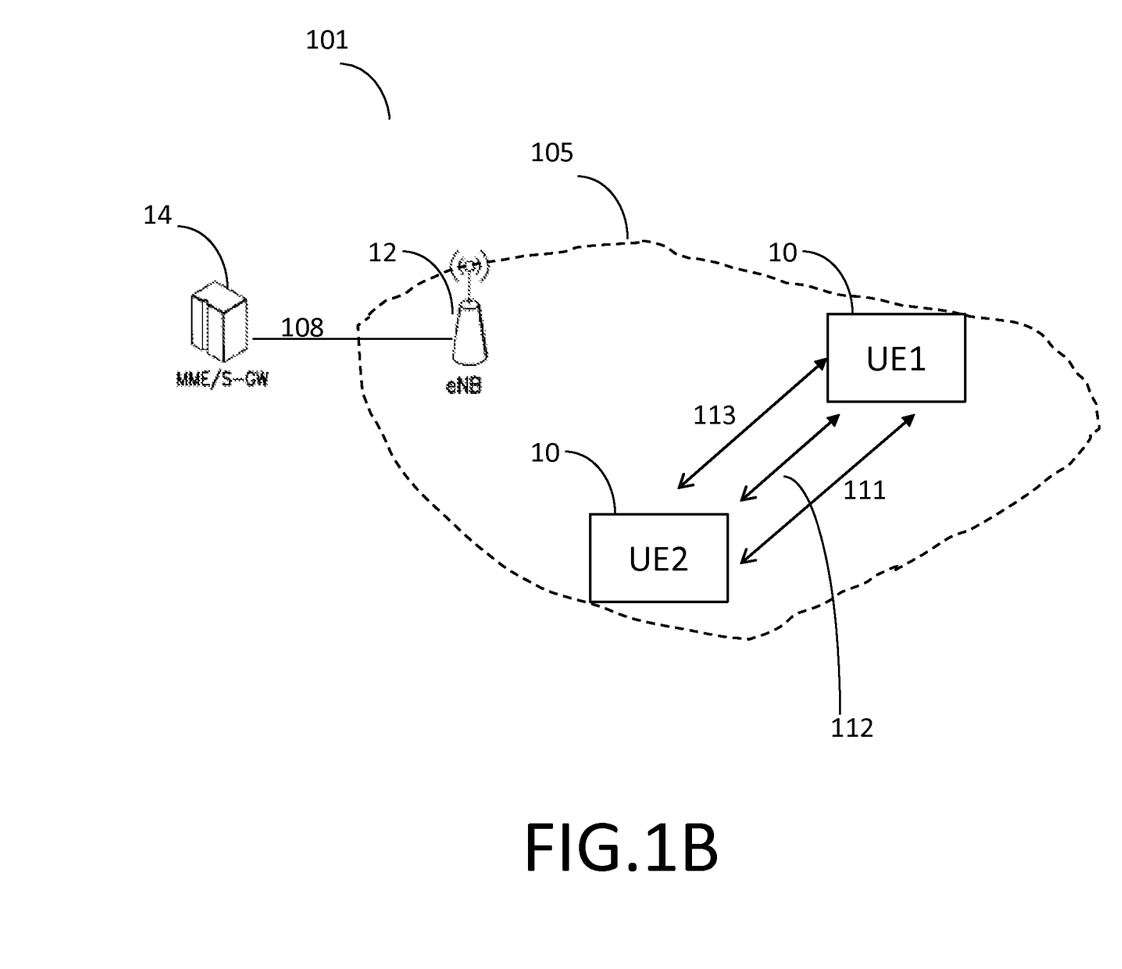
FIG. 1B shows a simplified network architecture diagram suitable for practicing example embodiments of this invention.

FIG. 1B shows a simplified network architecture diagram suitable for practicing example embodiments of this invention. In an example embodiment, a network 101 employs WCDMA radio access technology. MME/S-GW 14 is coupled to the eNB 12 via a connection 108, such as internet protocol (IP) over multi-protocol label switching (MPLS) over synchronous digital hierarchy (SDH) link. MME/S-GW 14 may be further coupled to network elements, such as home subscriber server (HSS), packet data gateway (PDG) and other gateways and servers. User terminals UE1 10 and UE2 10 are within the radio coverage area 105 of the eNB 12. Terminals (devices) UE1 10 and UE2 are coupled to the cellular network 101 via eNB 12. UE1 10 and UE2 10 have device-to-device communication 113 on licensed band for control plane communication. According to some embodiments of the present invention, UE 1 10 and UE2 10 have also device-to-device communication 112 on licensed band for user plane communication. In some embodiments of the present invention, control plane and user plane data utilize the same device-to-device communication. The user plane communication may be used for application layer data, such video call or file transfer. Also shown is device-to-device communication 111 on unlicensed band for user plane communication. In an example embodiment of the present invention, the device-to-device communication 111 on unlicensed band may employ IEEE 802.11 based wireless local area network (WLAN) technology. One of the devices may act as a WLAN access point (AP) or alternatively, the devices may employ peer-to-peer or direct mode approach. Specific example technologies for device-to-device communication 111 on unlicensed band are, in addition to basic WLAN, are at least Wi-Fi Direct by Wi-Fi Alliance, IEEE 802.11s (Mesh) or IEEE 802.11z (Direct Link Setup), IEEE 802.16, Bluetooth (BT), ultra wideband (UWB) or any other radio access technology suitable for operation on unlicensed band between devices. Above-mentioned technologies for unlicensed band device-to-device communication may be used, alone or together, for control plane or user plane communication.

The licensed band is controlled by at least one network element, such as eNB 12. eNB 12 is in charge of allocating or scheduling resources for device-to-device communication on licensed bands. Example resources are time or frequency resources or resource blocks. The resources may be requested from eNB 12 by UE1 10, UE2 10, MME/S-GW 14 or by some other network element. Cellular communication and licensed band device-to-device communication compete for the same radio resources. Cellular communication systems, such as LTE, operate on spectrum that is typically licensed to network operators. In contrast, WLAN typically operates on unlicensed band. The unlicensed band resources are free to use and not regulated by the government. It should be appreciated that according to some embodiments, licensed band technologies, such as LTE-A, may also be deployed on unlicensed band for device-to-device communication. Alternative or additionally, unlicensed band technologies, such as WLAN, may be deployed in licensed band under the control of a network.

The long term evolution (LTE) scheduling operates on short time intervals of 1 ms subframes and on flexible frequency allocations in physical resource blocks (PRB) of 180 kHz. Therefore, licensed band device-to-device (D2D) communication may find short time intervals and frequency proportions, where communications is feasible without causing harmful interference to the cellular network. One approach to coordinate interference between the cellular and licensed band D2D communications is to assign dedicated physical resource blocks (PRBs) for D2D, where these resources are dynamically adjusted based on temporal needs. Dedicated resources for licensed band D2D communications could lead to inefficient use of the available resources and efficiency may be increased when licensed band D2D links would reuse the same PRBs as allocated for the cellular links. In order to control the interference from licensed band D2D to the cellular network when reusing the same resources, it may be beneficial if the eNB 12 is able to control the maximum transmit power of licensed band D2D transmitters at terminals, such as UE1 10 and UE2 10. Furthermore, the eNB 12 assigns resources to licensed band D2D connections reusing either the uplink or downlink resources or both, in the cellular network.

There is no fundamental difference in the interference coordination mechanisms when licensed band D2D works as an underlay to an LTE network operating in frequency division duplex (FDD) or time division duplex (TDD) mode. In D2D links, there is no clear differentiation between the uplink and downlink as such.

When sharing cellular resources, a suitable licensed band D2D transmit power level may be found by long term observations of the impact for different D2D power levels on the quality of the cellular links. In addition, the eNB 12 may ensure that the cellular users scheduled on the same resources with the D2D connections are well isolated in propagation conditions. For example, the eNB 12 might schedule licensed band indoor D2D connections together with outdoor cellular users.

In some embodiments, the network 101 may employ one or more radio access technologies (RATS), such as WCDMA, CDMA2000, GPRS, LTE, LTE-A or GSM.

Although the FIG. 1B shows two devices UE1 10 and UE2 10 within the coverage area 105 of one eNB 12, it should be appreciated that other configurations are also possible. For example, one or both device UE1 10 or UE2 10 could alternatively locate in coverage area other than coverage area 105. There may also be other eNBs 12 in the vicinity of the eNB 12.

In some example embodiments, the UE1 10 or UE2 10 may be a mobile communication device such as, for example, a personal digital assistant (PDA), mobile telephone, mobile computing device, camera, video recorder, audio/video player, positioning device (e.g., a global positioning system (GPS) device), game device, television device, radio device, or various other like devices or combinations thereof Alternative or additionally, UE1 10 or UE2 10 may be a component for such as device. As such, the device UE1 10 or UE2 10 may include one or more processors and one or more memories for storing instructions, which when executed by the processor, cause the UE1 10 or UE2 to operate in a particular way or execute specific functionality. The UE1 10 or UE2 10 may also include communication circuitry and corresponding hardware/software to enable communication with other devices. The device 10 may also include user interface circuitry and user interface software configured to facilitate user control of at least some functions of the mobile phone though use of a display and configured to respond to user inputs and a display and display circuitry configured to display at least a portion of a user interface of the mobile phone, the display and display circuitry configured to facilitate user control of at least some functions of the mobile phone.

Figure 2:
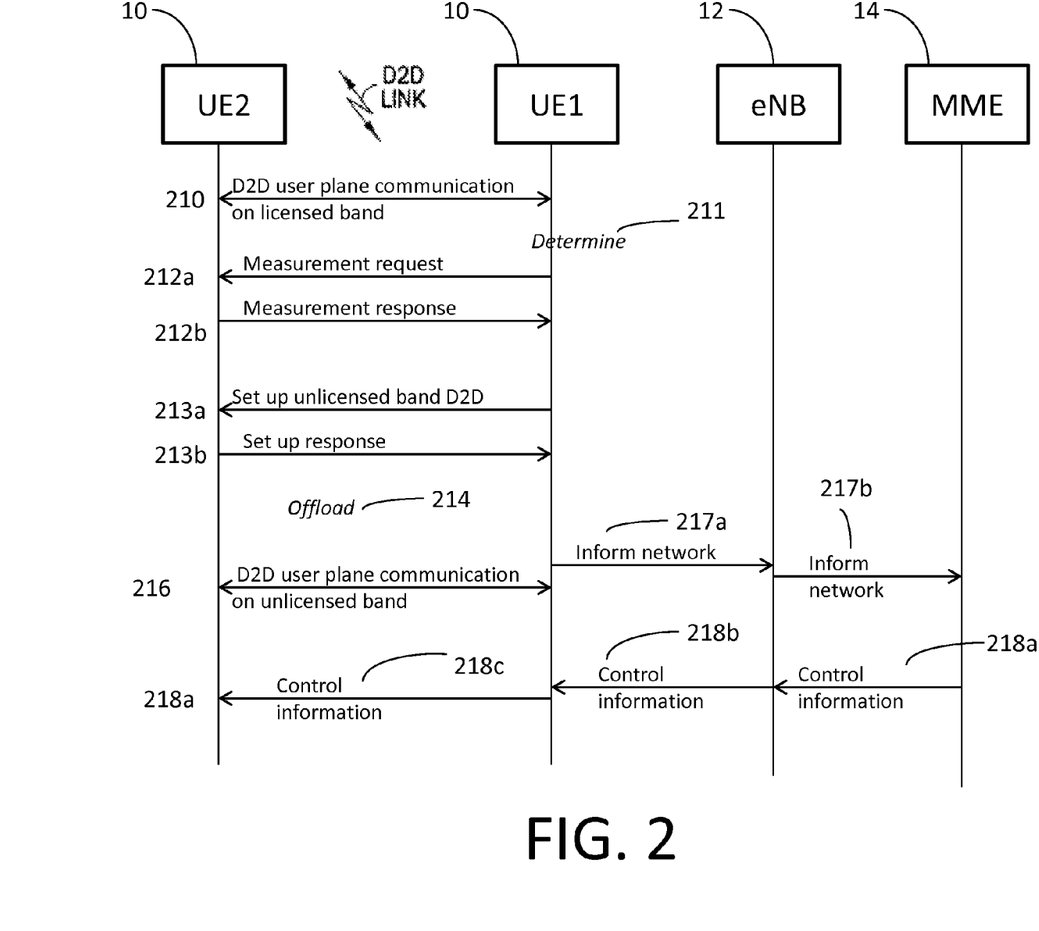
FIG. 2 shows a flow diagram illustrating a device offloading user plane device-device communication from licensed band to unlicensed band, according to an example embodiment of the present invention.

FIG. 2 shows a flow diagram illustrating a device offloading user plane device-device communication from licensed band to unlicensed band, according to an example embodiment of the present invention. In an example embodiment, UE1 10 and UE2 10 are under the control of the same network and the same eNB 12. UE1 10 and UE2 10 are coupled to the eNB 12. The eNB 12 facilitates device-to-device communication 210 between UE1 10 and UE2 10 on licensed band by allocating or scheduling licensed band resources. In an example embodiment, the device-to-device communication 210 is user plane data, such as user's application layer data. Alternatively or additionally, the device-to-device communication 210 is control plane data, or both control plane and user plane data. There may be additional licensed or unlicensed band device-to-device communications simultaneously. In the example of FIG. 2, the device-to-device communication 210 on licensed band is under the control of eNB 12. UE1 10 and UE2 10 are communicating with each other using device-to-device communication on licensed band by providing and/or receiving data directly between UE1 10 and UE2 10. In some embodiments, the UE1 10 and UE2 10 are communicating so that only control plane data is exchanged between them, but UE1 10 and UE2 10 are ready to provide and/or receive user plane data, too. In one example, UE1 10 and UE2 10 exchange user plane data via device-to-device communication 210 on licensed band. User plane data may not be transferred all the time.

At 211, UE1 10 determines whether device-to-device communication resources on unlicensed band resources are available. The determining is done in preparation for device-to-device communication on unlicensed band with UE2 10. The determining may be done occasionally, periodically, continuously, or triggered by some event, message or other reason.

In some embodiments of the present invention, UE1 10 determines locally the unlicensed band resource availability by listening if there are inactive WLAN channels available. Alternatively or additionally, UE1 10 may probe other frequency or time resource or resource block availability. Alternatively or additionally, UE1 10 may measure channel quality, power levels, location, distance to other devices, or bandwidth. The bandwidth may be, for example, available bandwidth that is free to be used. Alternatively or additionally, the bandwidth may be consumed bandwidth in found channels. UE1 10 may also ask resource availability information from a cellular or a local area network element or from other device. UE1 10 may also measure how many devices there are in potential channels, such as in a WLAN channel. According to an example embodiment of the presented invention, the determining at UE1 10 is triggered when UE1 enters certain location area, or the distance to other device or bandwidth falls below threshold. In some embodiments, trigger levels are set. For example, when the licensed band power allocation trigger exceeds certain threshold then the determining is started. In another example, the trigger may be minimum threshold of cluster population. In some embodiments, the trigger information may be provided by a network element, such as eNB 12 or MME 14 or device UE2 10. In some embodiments of the present invention, the trigger may be provided via unlicensed band D2D resources, short message service/multimedia messaging service (SMS/MMS), Bluetooth (BT), or ultra wideband (UWB) message. Application layer protocols, such internet protocol version 4 (IPv4), internet protocol version 6 (IPv6), session initiation protocol (SIP) or extensible messaging and presence protocol (XMPP) may also be utilized for providing trigger information.

According to some embodiments of the present invention, UE1 10 and UE2 10 negotiate directly between them. During the negotiation, at 212a, UE1 10 provides a measurement request to the UE2 10 via existing device-to-device communication that allows control communication. Receiving the measurement request triggers UE2 10 to start the determining at UE2 10. The control communication may utilize either user plane device-to-device communication 210, or a separate licensed band control plane or user plane device-to-device communication. Additionally or alternatively, the negotiating is carried out via cellular network or unlicensed band device-to-device communication or via SMS, MMS, UWB, or BT. Alternatively, or additionally, the negotiation may be carried out using SIP or XMPP.

At 212b, the UE2 10 responds with a measurement response. The measurement request and response allow negotiation and exchange of information between UE1 10 and UE2 10. In some embodiments, there may be multiple additional devices, such as UE3 and UE4 in the device-to-device communication. The measurement negotiation may exchange information indicative of local radio capability, spectrum probing information, available channel identification, medium access control (MAC) address, radio access technology preference information, bandwidth, power level, location, offloading capability, offloading preference and/or channel quality information. As an example, available channel identification may be the channel identification of the available WLAN channel that the device found. Once the UE1 10 receives the one or more measurement response, it knows what kind of unlicensed band device-to-device communication may be established with UE2 10. UE1 10 may also store the information. The stored information may be used in the future when UE1 10 wants to establish unlicensed band device-to-device communication with UE2 10.

As an example, after receiving the measurement request from UE1 10, UE2 10 determines if there are inactive WLAN channels available for device-to-device communication with UE1 10. UE2 10 reports the information back to UE1 10. It the same WLAN channel is found by both UE1 10 and UE2 10 it is possible to set up the device-to-device communication on that WLAN channel. In some embodiments, UE1 10 initiates a set up of unlicensed band device-to-device communication.

At 213a, UE1 10 initiates the unlicensed band device-to-device communication set up. The unlicensed band device-to-device communication set up may be initiated via existing device-to-device communication on licensed band. UE2 10 responds with one or more responses at 213b. The set up at 213a and at 213b may utilize either user plane device-to-device communication 210, or a separate licensed band control plane device-to-device communication. In some embodiments, the control communication for set up may also utilize existing unlicensed band device-to-device communication. Alternatively, or additionally, the set up utilizes cellular network, SMS, MMS, Bluetooth, SIP, XMPP or UWB messages.

According to an example embodiment of the present invention, the measurement request and response are carried out using radio resource control (RRC). Alternatively, or additionally, medium access control (MAC) protocols, WLAN negotiation or application layer negotiation, such as IP, SIP, or XMPP based negotiation, or SMS, MMS, Bluetooth, UWB based negotiations may be used.

In some embodiments of the present invention, the set up request and response provide and/or receive information indicative of channel identification, timing information, frequency band, resource block, radio access technology, security or authentication keys, session initiation protocol address, offloading capability, offloading preference, internet protocol address, and/or the like.

The set up request and response enable the establishment and bearer setup of a new unlicensed device-to-device communication 216.

According to some example embodiments of the present invention, UE1 10 provides reachability information, associated with the unlicensed band device-to-device communication to UE2 10 via the device-to-device communication on licensed band. Alternatively or additionally, the reachability information is provided via device-to-device communication on unlicensed band, or via SMS, MMS, Bluetooth or UWB. The reachability information may be for example, IP address, device uniform resource identifier (URI), user uniform resource identifier (URI), phone number, international mobile equipment identity (IMEI), MAC level address, Bluetooth address or some other reachability contact address for the user or the device.

In some embodiments of the present invention, one or more of the devices, such as UE1 10, starts offloading at 214, when the new unlicensed band device-to-device communication 216 has been set up. As an example, the application layer data traffic is now directed to the new unlicensed band device-to-device communication 216, instead of licensed band 210. In some embodiments of the present invention, the application layer data is Internet Protocol (IP) layer data, such as file transfer, synchronization data, chat, printing data, or Voice or Video over IP data. Alternatively or additionally, the application layer data may be non-IP data. Alternatively, or additionally, the resources associated with the licensed band 210 may be released. In some embodiments, UE1 10 and/or UE2 10 switch to a new cellular state or mode, such as idle or sleep mode, after the device-to-device communication 216 has been set up. This enables UE1 10 or UE2 10 to operate accordingly towards the cellular network.

In some embodiments of the present invention, at 217a, the UE1 10 informs the network element eNB 12. In an example embodiment, the information provided at 217a includes a request to stop scheduling resources for the licensed band device-to-device communication 210. According to some embodiments of the present invention, eNB 12 stops scheduling the resources for and/or releases current resources associated with the user plane device-to-device communication 210 on licensed band. Alternatively, or additionally, the information provided at 217a may include information indicative that the devices have established new device-to-device communication along with details associated with the new device-to-device communication. In some embodiments of the present invention, the information provided at 217a may include information indicative of another device, such as a UE2 10 leaving device-to-device communication or other changes in the communication. Alternatively or additionally, at 217a the information may include information indicative of device-to-device radio capability or preference of the other device. Alternatively or additionally, at 217a, the information may include offload information. For example, UE1 10 may inform eNB 12 that offloading user plane data communication from licensed band to unlicensed band has been completed. In some embodiments of the present invention, UE1 10 may provide the information to UE2 10, eNB 12, MME 14 or some other network element.

At 217b, eNB 12 forwards the information from eNB 12 to MME 14.

At 218a, eNB 12 receives control information from MME 14. Alternatively, or additionally, eNB 12 may receive the information from other network element, such as, for example, an offload server. At 218b, UE1 10 receives control information from the eNB 12. Alternatively or additionally, UE1 10 may receive the control information directly from MME 14 or from some other network element, such as offload server.

In some embodiments of the present invention, UE1 10 exchanges control information with a cellular network on behalf of at least one second device. Alternatively or additionally, UE1 10 routes user plane data traffic between cellular network and at least one second device. The at least one second device is coupled with UE1 10 via device-to-device communication. As an example, at 218b, the control information is a wake-up information for the at least one second device. In response of receiving the wake up request for other device, at 218c, UE1 10 may instruct the at least one second device to wake up. Alternatively, or additionally, at 218c, UE1 10 may page other devices or instruct the at least one second device to switch from licensed band to unlicensed band or vice versa.

According to some example embodiments of the present invention, the control information at 218a, 218b or 218c includes cellular state or mode information to UE1 10 and/or UE2 10. Examples of such modes are: sleep mode, idle mode, radio resource control (RRC) connected, or mobility management entity idle, d2d registration server function (DRSF) active, ITC connected mode with cell radio network temporary identifier (c-rnti) assigned, and/or the like.

Although only two devices UE1 10 and UE2 10 are shown, the device offloading of FIG. 2 may be implemented with more than two devices, such as mobile phones, sensors or other devices. Similarly, the device offloading of FIG. 2 may be implemented with a different number of network nodes, such as eNB 12 or MME 14. Further according to some embodiments, UE1 10 may generate the control information at 218c independently. For example, the control information may include information to switch or offload from one channel to another or to operate in master or slave role. In some embodiments of the present invention, devices, such as UE2 10 may similarly send any control information to the network elements, via UE1 10. Example control information from UE1 10 to UE2 10 is information indicative of UE2 10 to start operating in cellular idle state or in d2d slave mode.

In some embodiments, the licensed band device-to-device communication 210 is according to LTE-A TDD, deployed in uplink part of a serving LTE-A FDD system. eNB 12 schedules resources for licensed band device-to-device communication 210. In some embodiments, the unlicensed band device-to-device communication 216 is according to WLAN or Wi-Fi direct mode. Alternatively or additionally, the unlicensed band device-to-device communication 216 is according to LTE-A based technology, deployed on unlicensed band. In some embodiments, there are additional licensed and unlicensed band device-to-device communications. These device-to-device communications enable user plane data, control plane data, or both.

Figure 3:
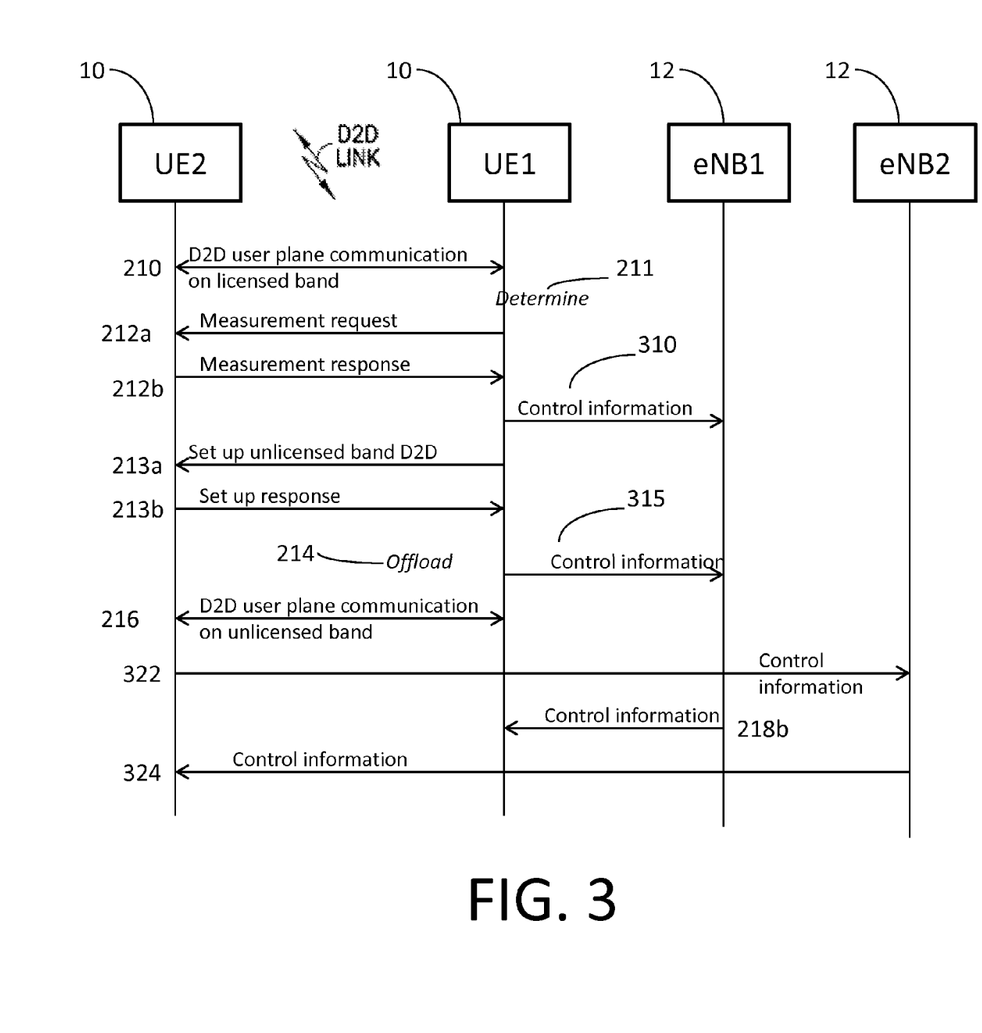
FIG. 3 shows a flow diagram illustrating a device offloading user plane device-device communication from licensed band to unlicensed band, according to another example embodiment of the present invention.

FIG. 3 shows a flow diagram illustrating a device offloading user plane device-device communication from licensed band to unlicensed band according to an example embodiment. In an example embodiment, devices UE1 10 and UE2 10 are coupled to different eNB 12 nodes. The different eNB12 nodes may belong to the same or different network operators.

In FIG. 3, 210, 211, 212a, 212b are similar to FIG. 2.

At 310, UE1 10 provides control information to eNB1 12. In some embodiments of the present invention, at 310 the control information includes information indicative of device-to-device radio capability or preference of the at least one second device, or whether the at least one second device left or joined the device-to-device communication. For example, UE1 10 could report that UE2 10 left the device-to-device communication 216 on unlicensed band. One reason why UE2 10 left the communication 216 is that UE2 10 moved outside of WLAN coverage area from UE1 10.

310 is similar to 217a in FIG. 2. 315 is similar to 310 of FIGS. 3 and to 217a of FIGS. 2. 213a, 213b, 214 and 216 are similar to corresponding steps of FIG. 2.

At 322, UE2 10 provides control information to eNB 12. 218b is similar to FIG. 2. At 324, eNB2 12 provides control information to UE2 10. The control information at 322 or 324 may comprise control information or information examples described with reference to FIG. 2. For example, UE2 10 may request eNB2 12 to stop scheduling resources. In some embodiments, UE1 10 and UE2 10 utilize a device-to-device communication on licensed band, under the control of one of the network nodes, such as eNB1 12. Alternatively, or additionally, UE1 10 and UE2 10 may utilize device-to-device communication on unlicensed band.

Figure 4:
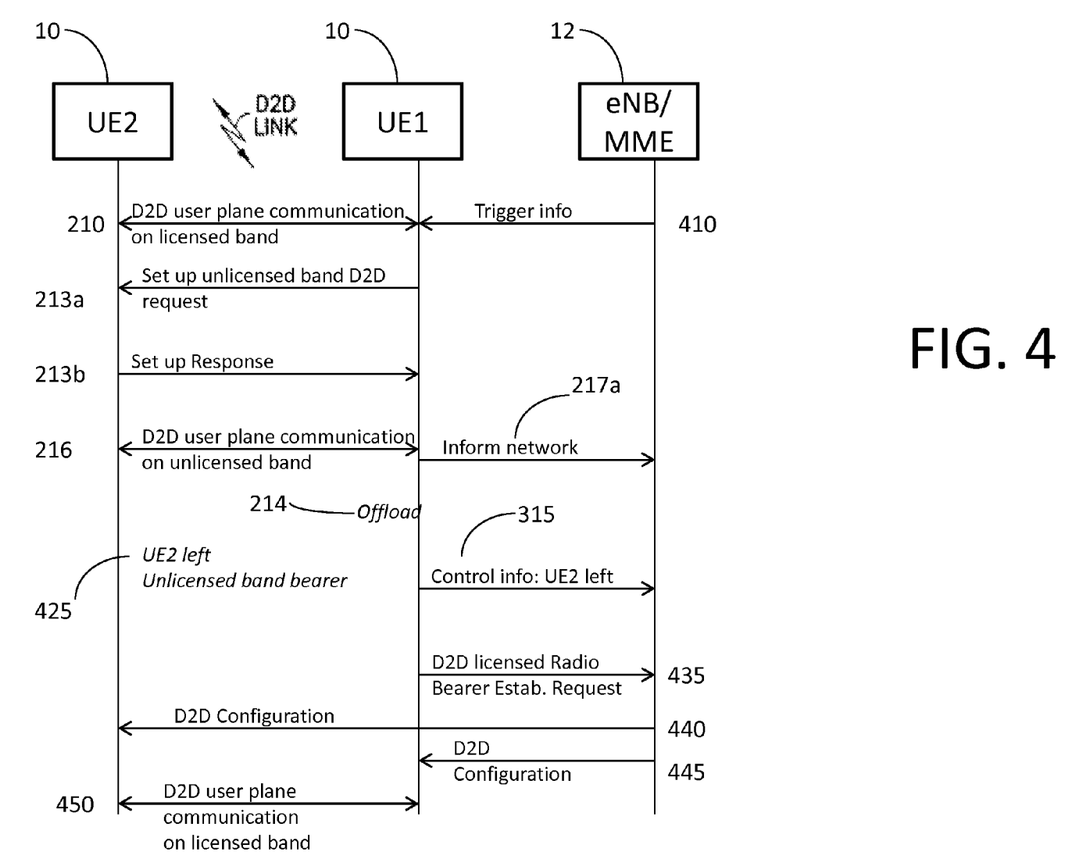
FIG. 4 shows a flow diagram illustrating a device offloading user plane device-device communication from licensed band to unlicensed band according to yet another example embodiment of the present invention.

FIG. 4 shows a flow diagram illustrating another example of a device offloading user plane device-device communication from licensed band to unlicensed band, according to an example embodiment. In the example embodiment of FIG. 4, the network provides trigger information to the devices, assisting the devices in offloading. In an example embodiment, eNB 12 contains functionality of MME 14 of FIG. 2.

At 410, eNB 12 provides trigger information to the UE1 10. The trigger information may be used to help UE1 10 to decide, start, determine or investigate offloading. According to some embodiments of the present invention, the trigger information comprises channel quality, power level, bandwidth, offloading capability, preference or willingness information. For example, the eNB 12 may provide information indicative of the channel quality or transmit power levels in unlicensed or licensed bands. That information may assist UE1 10 when it determines or starts offloading to unlicensed band with another device.

210, 213a, 213b, 216, 214 and 217a are similar to corresponding steps of FIG. 2.

At 425, UE2 left the unlicensed device-to-device communication. For example, UE2 10 may have voluntarily left the communication, or UE2 10 may have been dropped because it moved outside of WLAN coverage area UE2 10 shared with UE1 10.

315 is similar to 315 of FIG. 3. For example, at 315, UE1 10 reports to eNB/MME 12 that UE2 10 left the unlicensed band device-to-device communication.

At 435, UE1 10 initiates licensed band set up request 435 to the eNB 12. At 440, eNB/MME 12 configures or enables configuration of a new licensed band device-to-device communication 450 for UE2 10. At 445, eNN/MME 12 configures or enables the configuration of the new licensed band device-to-device communication 450 for UE1 10. Alternatively, or additionally, earlier established licensed band device-to-device communication 210 may have been held alive and just re-activated or reused. In any case, licensed band device-to-device communication 450 or 210 allow devices UE1 10 and UE2 10 to continue device-to-device communication, if, for example, UE2 had left the unlicensed band device-to-device communication 216.

In some embodiments, the licensed band device-to-device communication 450 is according to LTE-A, deployed in uplink part of a serving LTE-A system. eNB 12 schedules resources for licensed band device-to-device communication 450. In some embodiments, the unlicensed band device-to-device communication 216 is according to WLAN or Wi-Fi direct mode. Alternatively or additionally, the unlicensed band device-to-device communication 216 is according to LTE-A based technology, deployed on unlicensed band.

Figure 5:
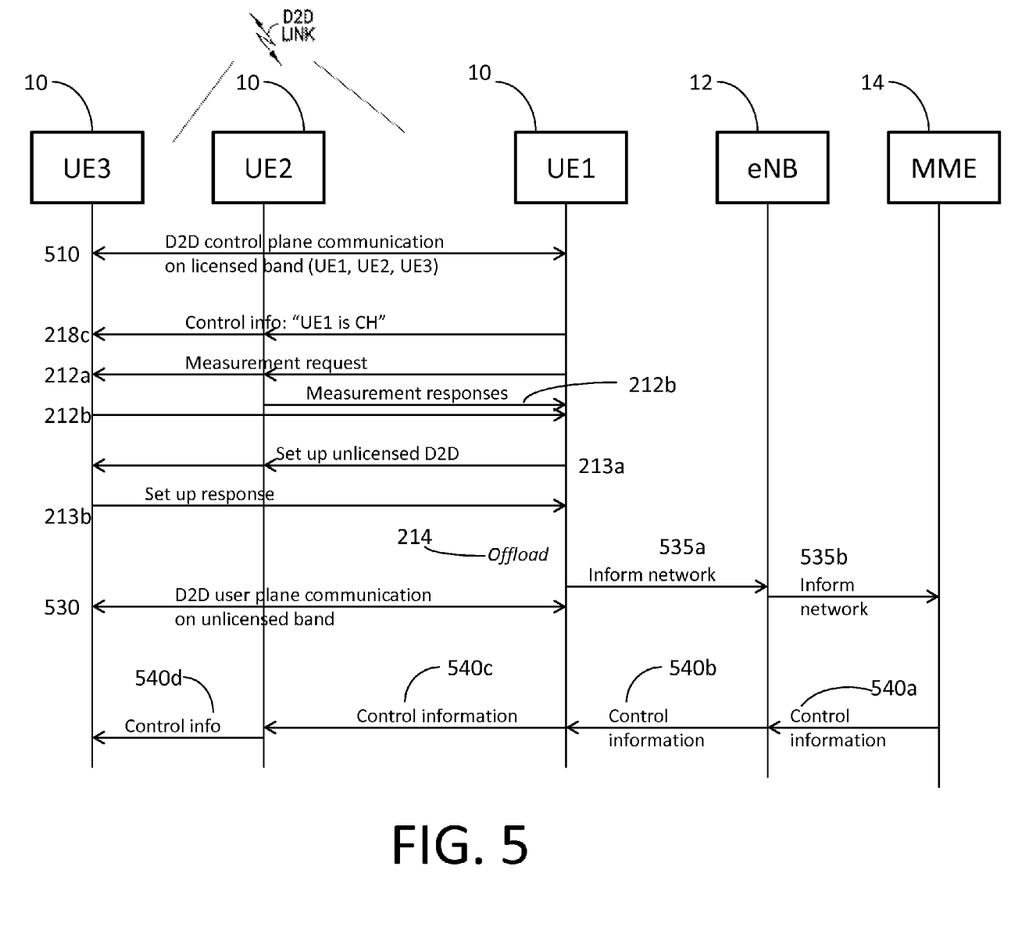
FIG. 5 shows a flow diagram illustrating a device offloading user plane device-device communication from licensed band to unlicensed band, according to yet another example embodiment of the present invention.

FIG. 5 shows a flow diagram illustrating a device offloading user plane device-device communication from licensed band to unlicensed band according to yet another example embodiment of the present invention.

In the example embodiment of FIG. 5, three devices, UE1 10, UE2 10 and UE3 10 are illustrated participating in device-to-device communication 510 on licensed band. According to one or more embodiments of the present invention, UE1 10 is acting as a cluster head (CH) or master device for the other devices. UE2 10 and UE3 10 are acting as slave devices.

218c, 212a, 212b, 213a, 213b, and 214 are similar to the corresponding steps of FIGS. 2-4. For example, at 218c, UE1 10 provides control information to UE2 10 and UE3 10. In the example of FIG. 5, the control information at 218c is information that UE1 10 is the cluster head.

Additionally, or alternatively, UE1 10 may initiate measurement request and set up request to UE2 10 and UE3 10, as described earlier with reference to FIGS. 2-4.

At 535a, UE1 10 informs the eNB 12 or MME 14 to stop scheduling resources for the licensed band device-to-device communication. Alternatively or additionally, eNB 12 may provide the information to MME 14.

At 530, the unlicensed band device-to-device communication is active.

According to some embodiments of the present invention, at 540a, 540b, 540c and 540d, control information is exchanged between devices and other elements, as described earlier with reference to FIG. 2-4. For example, as a non-limiting example, the control information may include wake-up information for at least one device. In response to receiving the wake-up information, UE1 10 may instruct, at least one second device to wake up.

Figure 6:
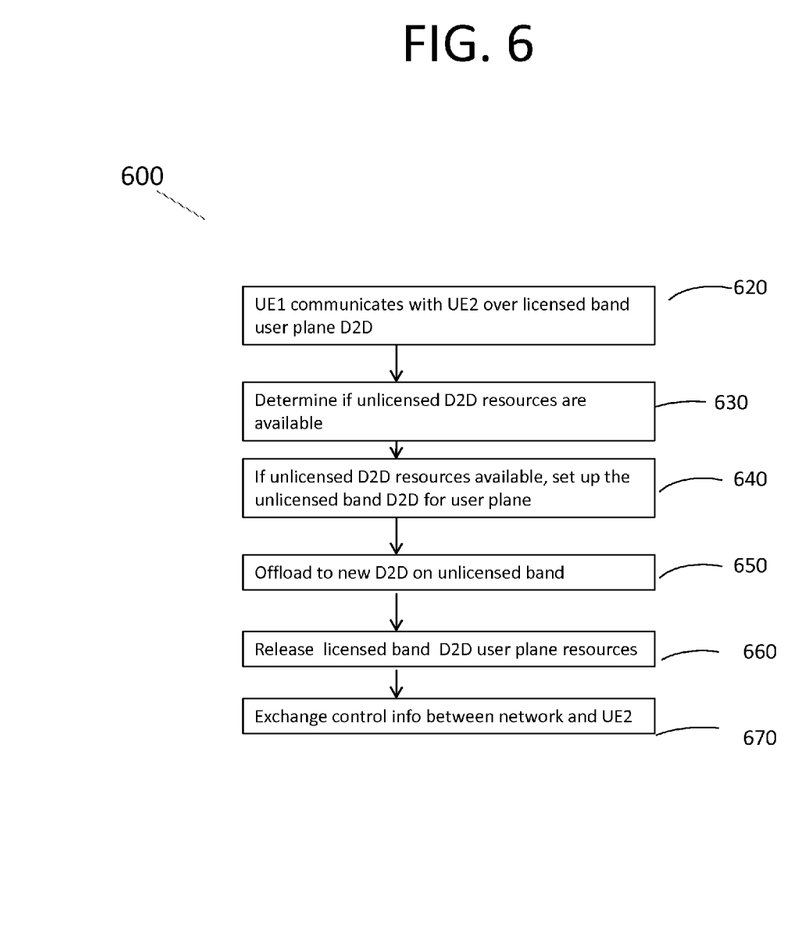
FIG. 6 is a flow chart showing an example method for off loading communication from licensed band to unlicensed band according to an example embodiment of the present invention.

FIG. 6 is a flow chart showing an example method 600 operating in accordance with an example embodiment of the present invention. Example method 600 may be performed by an electronic device, such as UE1 10 of FIG. 1A or FIG. 1B.

At 620, the device communicates with the other device, such as UE2 of FIG. 1A or FIG. 1B. In the example embodiment of FIG. 6, the communication is carried out via device-to-device communication on licensed band. According to an example embodiment, the device sends and receives video over IP data with the other device.

At 630, the device determines if unlicensed band resources are available for D2D communication. In an example embodiment, the determining is triggered periodically. Alternatively, or additionally, the trigger may be a message from other UE2. Further, the determining may be triggered when the device enters a certain area.

At 640, if the resources are available, the device sets up the unlicensed band device-to-device communication.

At 650, the device offloads current user plane device-to-device communication on licensed band to unlicensed band device-to-device communication.

At 660, the device releases the possibly remaining licensed band user plane device-to-device communication resources.

At 670, the device exchanges control information with eNB and UE2. For example, the device may forward a wake-up request from the eNB to UE2. According to another embodiment, the device may route Internet data between UE2 and eNB.

Figure 7:
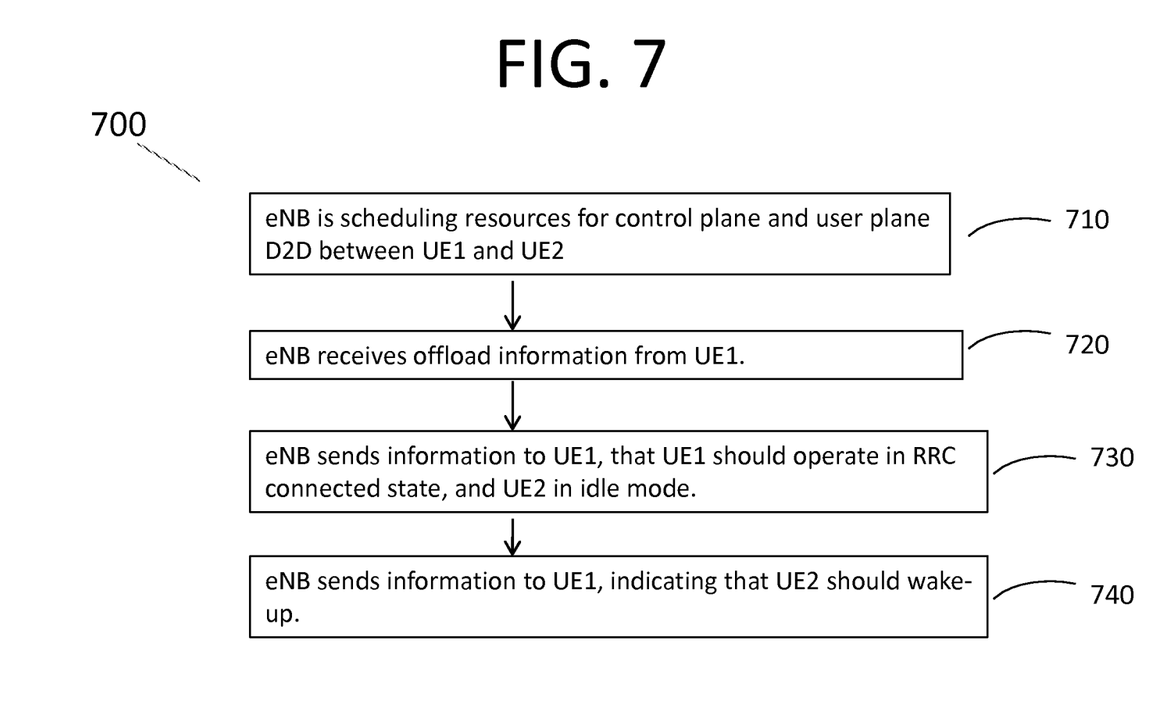
FIG. 7 is a flow chart showing an example method for device initiated offloading from licensed band to unlicensed band according to yet another example embodiment of the present invention.

FIG. 7 is a flow chart showing an example method 700 for device initiated offloading from licensed band to unlicensed band according to yet another example embodiment of the present invention. Example method 700 may be performed by an electronic device, such as eNB1 12 of FIG. 1A or eNB 12 of FIG. 1B. In an alternative embodiment, the method 700 may be performed by a MME 14 of FIG. 1A or MME/S-GW 14 FIG. 1B or by different network element, such as an offload server.

At 710, the eNB is facilitating licensed band D2D resources for devices. In an example embodiment, eNB is scheduling resources for licensed band D2D communication between UE1 and UE2 of FIG. 1A or FIG. 1B. In some embodiments, the licensed band D2D communication is for user plane data. Alternatively or additionally, there may be a separate licensed band D2D communication for control plane data or control and user plane data.

At 720, the eNB receives offload information from UE1 indicating, for example, that UE1 and UE2 have, autonomously, established unlicensed band user plane data D2D communication. Alternatively or additionally, eNB may receive offload information indicative that the scheduling for user plane licensed band D2D may be stopped. In some embodiments, the licensed band control plane D2D communication is continued.

At 730, eNB sends information to UE1, that UE1 should function in RRC connected state, and UE2 in idle mode. Alternatively, the information may be indicative of any other cellular state according to what UE1 or UE2 should function.

At 740, the cellular network node sends information to UE1, indicating that UE2 should wake-up.

It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts block(s).

Without in any way limiting the scope, interpretation, or application of the claims appearing below, a technical effect of one or more of the example embodiments disclosed herein is to enable efficient spectrum usage. Another technical effect of one or more example embodiments is that the devices themselves are able to offload autonomously without need of network node control and supervision Accordingly, blocks of the flowchart support combinations of means for performing the specified functions, combinations of operations for performing the specified functions and program instruction means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

Although various aspects of the invention are set out in the independent claims, other aspects of the invention comprise other combinations of features from the described embodiments and/or the dependent claims with the features of the independent claims, and not solely the combinations explicitly set out in the claims.

Embodiments of the present invention may be implemented in software, hardware, application logic or a combination of software, hardware and application logic. The software, application logic and/or hardware may reside on an electronic device.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
    communicating, by a first device, with a second device, using a first device-to-device communication in a licensed band;
    determining, by the first device, whether resources are available in an unlicensed band, wherein the determining is performed in a region local to the first device by listening for an inactive channel, and wherein the determining is performed periodically or triggered at the first device upon receipt of a message from the second device; and
    initiating, by the first device, a set up of a second device-to-device communication in the unlicensed band, when the resources are determined available in the unlicensed band,
    wherein the determining whether the resources are available in the unlicensed band comprises negotiating with the second device, and
    wherein at least one of the negotiating with the second device and the set up of the second device-to-device communication in the unlicensed band is carried via the first device-to-device communication in the licensed band.

2. The method of claim 1, wherein the negotiating with the second device comprises:

providing at least one measurement request message by the first device to the second device; and receiving at least one measurement response message from the second device.

3. The method of claim 1, wherein the determining whether the resources are available in the unlicensed band is triggered by a change in at least one of a channel quality, a power level, a location, and an indication that an available bandwidth falls below a threshold.

4. The method of claim 1, wherein the determining whether the resources are available in the unlicensed band comprises at least one of a probing spectrum availability and a measuring at least one of a channel quality, a power level, a bandwidth, a number of device-to-device connections, and a number indicating a device-to-device cluster population.

5. The method of claim 1, further comprising providing information to a cellular network element to stop scheduling at least a portion of the resources of the first device-to-device communication in the licensed band.

6. The method of claim 1, further comprising offloading at least a portion of a user plane communication from the first device-to-device communication in the licensed band to the second device-to-device communication in the unlicensed band.

7. An apparatus comprising:
at least one processor; and
at least one memory including computer program code, the at least one processor, the at least one memory, and the computer program code configured to cause the apparatus to at least:
communicate with a second apparatus using a first device-to-device communication in a licensed band;
determine whether resources are available in an unlicensed band, wherein the determining is performed in a region local to the apparatus by listening for an inactive channel, and wherein the determining is performed periodically or triggered at the apparatus upon receipt of a message from the second apparatus; and
initiate a set up of a second device-to-device communication in the unlicensed band when the resources are determined available in the unlicensed band,
wherein the determining whether the resources are available in the unlicensed band comprises negotiating with the second device, and
wherein at least one of the negotiating with the second device and the set up of the second device-to-device communication in the unlicensed band is carried via the first device-to-device communication in the licensed band.

8. The apparatus of claim 7, wherein at least one of the negotiating with the second device and the initiating the set up of a device-to-device communication in the unlicensed band is configured to be carried using at least one of the device-to-device communication in the unlicensed band, a short message service, a multimedia messaging service, a bluetooth message service, and an ultra wideband message service.

9. The apparatus of claim 7, wherein the apparatus is a mobile phone further comprising:
a user interface and a display configured to facilitate user control of at least some functions of the mobile phone, the user interface and display configured to respond to user inputs.

10. A non-transitory computer-readable medium encoded with instructions that, when executed by a processor, perform at least the following:
communicate, by a first device, with a second device, using a first device-to-device communication in a licensed band;
determine, by the first device, whether resources are available in an unlicensed band, wherein the determining is performed in a region local to the first device by listening for an inactive channel, and wherein the determining is performed periodically or triggered at the first device upon receipt of a message from the second device; and
initiate, by the first device, a set up of a second device-to-device communication in the unlicensed band, when the resources are determined available in the unlicensed band,
wherein the determining whether the resources are available in the unlicensed band comprises negotiating with the second device, and
wherein at least one of the negotiating with the second device and the set up of the second device-to-device communication in the unlicensed band is carried via the first device-to-device communication in the licensed band.

* * * * *